(12) United States Patent
Gross et al.

(10) Patent No.: US 7,078,835 B2
(45) Date of Patent: Jul. 18, 2006

(54) RECEPTACLE HOUSING FOR MOUNTING A FAN MOTOR TO A CARRIER

(75) Inventors: Gerhard Gross, Lauf (DE); Ralf-Michael Schneider, Rheinmuenster (DE); Peter Nolting, Buehlertal (DE); Wolfgang Frank, Buehl-Altschweier (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 10/363,624

(22) PCT Filed: Jun. 27, 2002

(86) PCT No.: PCT/DE02/02344

§ 371 (c)(1),
(2), (4) Date: Aug. 1, 2003

(87) PCT Pub. No.: WO03/005532

PCT Pub. Date: Jan. 16, 2003

(65) Prior Publication Data

US 2004/0012289 A1 Jan. 22, 2004

(30) Foreign Application Priority Data

Jul. 3, 2001 (DE) ................................ 101315902

(51) Int. Cl.
*H02K 5/00* (2006.01)
*H02K 5/24* (2006.01)

(52) U.S. Cl. .......................................... 310/89; 310/91

(58) Field of Classification Search .................. 310/89, 310/43, 45, 88, 90; 384/295
See application file for complete search history.

(56) References Cited

U.S. PATENT DOCUMENTS

| 5,861,691 | A  | * | 1/1999  | Soh et al.         | ...... 310/89 |
| 5,883,451 | A  | * | 3/1999  | Majchrzak et al.   | ...... 310/89 |
| 5,945,756 | A  | * | 8/1999  | Periyathamby et al.| ...... 310/89 |
| 6,262,504 | B1 | * | 7/2001  | Bartlett           | ...... 310/89 |
| 6,333,576 | B1 | * | 12/2001 | Ishikawa et al.    | ...... 310/85 |
| 6,831,435 | B1 | * | 12/2004 | Suzuki             | ...... 318/483 |

FOREIGN PATENT DOCUMENTS

| DE | 36 18 177 A1  | 12/1987 |
| DE | 43 34 124 A1  | 9/1994  |
| DE | 196 52 328 A1 | 6/1998  |

* cited by examiner

*Primary Examiner*—Tran Nguyen
(74) *Attorney, Agent, or Firm*—Michael J. Striker (57) ABSTRACT

A device (10) for mounting an electric motor (18), in particular a fan motor, includes an essentially pot-shaped receptacle housing (12)—functioning as motor housing (32)—with a receiving opening (14) into which at least part of the electric motor (18) extends. A holding flange (34) is attached to the receptacle housing (12) for mounting the motor housing (32) to a carrier element (36), e.g., a motor vehicle heater system and/or air conditioner. A mechanism for immobilizing the electric motor (18) radially and axially in the motor housing (32) is included. The receptacle housing (12) includes at least one resilient-elastic holding element (50, 52, 90) for axial immobilization.

21 Claims, 6 Drawing Sheets

RECEPTACLE HOUSING FOR MOUNTING A FAN MOTOR TO A CARRIER

BACKGROUND OF THE INVENTION

The invention is based on a device for mounting an electric motor, in particular a fan motor, according to the preamble of the independent claim.

Fan motors for heater and air-conditioner fan systems that are used in motor vehicles, for example, are usually decoupled from the vehicle in terms of vibration engineering in order to reduce a transfer of structure-borne noise from the motor and/or the fan unit to the vehicle body and, therefore, into the passenger compartment of the vehicle.

Main sources of undesired vibrations, e.g., in DC motors, are imbalances in the motor and the commutation inside the motor. Commutation occurs when the copper windings of the armature conduct current while the motor is operating. During each rotation of the armature shaft, current flows through the windings in the motor once in each direction. The current flow in the windings, influenced by a permanent magnet field, produces a reaction that is transferred as a torque pulse.

Common methods for mounting motors of this type in fan housings involve mounting the motor first in an adapter part, e.g., by plugging it in, and then mounting said adapter part in a motor holder. A flange is typically located on the motor holder itself to securely join the motor with the air conditioner, e.g., via a carrier part formed on the vehicle body.

To mount the actual motor in the adapter part or a motor housing, it is known to use snap-in hooks, to screw the components together, and to clamp the motor between two housing halves. It is furthermore known that electric motors can be pressed, with their pole rings, directly into a motor holder.

Elastic damping elements can be inserted between the adapter part accommodating the motor and the motor holder itself, which said elastic damping elements are intended to ensure that the motor holder is decoupled from the motor vibrations.

Normally, rubber is inserted in the form of appropriately formed rubber elements between the motor and the motor housing, in the flange or between the flange and a carrier element of the air conditioner, in order to dampen oscillations forming in the air conditioner or the vehicle body, and to suppress noises that are bothersome to the driver or his passenger in the passenger compartment of the vehicle.

In practical use, there are numerous possibilities for inserting the rubber and/or decoupling elements composed of rubber between the housing flange and the air conditioner and/or between the motor and the motor housing, in order to dampen the vibration pulses.

For example, DE 43 34 124 A1 discloses a device for housing an electric motor that attains a particularly low-vibration and, therefore, noise-damping effect by the fact that at least one elastic damping element is located between the inner walls of this housing device and the outer walls of the motor housing facing them, which said damping element bears against the walls of the housing device and the motor housing that face each other.

These elastic damping elements, which are rubber elements formed appropriately in a preferred exemplary embodiment of the device disclosed in DE 43 34 124 A1, require higher assembly and material expense, which unnecessarily increases the costs of such a device.

A holder for an electric motor is described in DE 36 18 177 A1, in the case of which the motor is inserted in a motor holder and secured against axial displacement by means of inwardly projecting, resilient noses.

A silenced holding device for an electric motor is made known in DE 196 52 328 C2, in the case of which the electric motor is placed in a first plug-in receptacle, which functions as an adapter part, and is secured axially by means of snap-in hooks. This plug-in receptacle comprises radially displaceable tongues in the fashion of flat springs distributed around its outer circumference. Pegs that project radially outwardly are integrally molded on these tongues, onto which correspondingly-shaped, silencing intermediate parts can be attached, such as rubber caps with a clamped connection.

The adapter part is inserted into a larger motor holding part during assembly of the holder disclosed in DE 196 52 328 C2. If the electric motor is now inserted, with its housing, into the adapter part, the tongue-like flat springs are pressed outwardly, so that they—helped along by the silencing intermediate parts—latch into corresponding immobilization openings of the motor holding part.

The method for holding the motor as disclosed by the teaching of DE 196 52 328 C2 is extremely costly and component-intensive, which results in higher assembly expense and, therefore, cost and time expense.

SUMMARY OF THE INVENTION

In contrast, the device according to the invention for mounting an electric motor has the advantage that a simple assembly of the motor is realized using fastening hooks without adapters, with simultaneous decoupling attained by means of rubber damping elements.

This results in a motor-motor housing combination that ensures that the electric motor will be held securely and in vibration-damped fashion with minimal expense for parts and assembly.

In advantageous fashion, a plurality of resilient-elastic holding elements of a receptacle housing, which functions as motor housing, grip the electric motor directly, so that the need to use adapter or intermediate housings is eliminated. The resilient-elastic holding elements of the device according to the invention are advantageously provided with an elastic material on the side facing the motor, at least in parts, so that additional vibration and noise damping results due to the elastic properties of this material.

In an advantageous exemplary embodiment of the device according to the invention, the elastic material—with which the resilient-elastic holding elements are provided on their side facing the motor—is a thermoplastic elastomer. It can be applied in simple and, therefore, advantageous fashion, directly to the resilient-elastic holding element, e.g., by means of a two-component spray process.

A device according to the invention that is easy to produce and has a particularly light installation weight results when the motor housing, i.e., the receptacle housing for the motor, as well as the resilient-elastic holding elements are made of a plastic, e.g., a polypropylene plastic.

This exemplary embodiment makes it possible to markedly reduce the weight of the device according to the invention for mounting the electric motor. In particular, the housing parts can be manufactured in an injection-molding process, so that it is also possible, in simple fashion, to form additional components and carrier elements for motor components on the housing.

The resilient holding elements for the motor can be developed directly on the pot-shaped receptacle housing in the shape of a tongue, preferably as a single component in one working step. In this case, the holding element can transition, on its lower end, directly into the wall of the receptacle housing, and it remains movable at its second axial end relative to the housing wall, so that a corresponding bending stress results on this tongue-like spring element, via which the motor can be immobilized in the housing device.

A secure mounting of the motor in the motor housing results in particular when the resilient-elastic holding elements comprise a hook-shaped fastening element on their exposed ends, e.g., in the form of detent noses that grip into or onto corresponding recesses and seating edges of the electric motor. In this fashion, the electric motor can be secured against sliding in the axial direction in a simple yet reliable manner.

In an exemplary embodiment of the device according to the invention, the holding elements grip, with their hook-shaped, exposed ends, on an end face of the electric motor. With this type of fastening, it is feasible that the electric motor can be placed in the motor housing in both possible orientations, which would expand the appliation width of the motor holder. For instance, the hook-shaped ends of the resilient holding elements can grasp around the end of the pole ring, for example, and thereby secure the motor axially.

The motor is therefore mounted directly in the motor housing with minimal expenditure for parts and assembly with the aid of fastening hooks, using elastic damping elements.

The same advantages also apply for a particularly advantageous exemplary embodiment of the device according to the invention for mounting a motor, in the case of which the hook ends of the resilient-elastic holding elements grip directly into the motor. The depth of the installed motor-motor housing combination can be reduced markedly when the snap-in hooks engage at a point not near the end face of the motor, e.g., directly in openings on the circumference of the pole ring. This makes it possible to attain an arrangement of a bladed fan wheel, for example, that is advantageous and close to the motor, since the geometry of the hook and holding element cannot collide with the bladed fan wheel.

If the detent elements are provided with a tangential coating in the region where they grip into the motor, nearly any coupling of noise and vibration into the hook ends and, therefore, the motor housing, is prevented. This measure also secures the motor itself against turning in the receptacle housing.

As an alternative, the electric motor can also be secured against radial rotation by means of stop pegs installed in the base region of the pot-shaped receptacle housing and projecting into the housing, which said stop pegs grip in corresponding openings of the electric motor. A particularly advantageous exemplary embodiment results when these stop pegs are also coated with an elastic material, such as a thermoplastic elastomer. The latter method simplifies the manufacture of the fastening hooks.

To increase the dynamic stability of the motor in the motor housing, additional elastic supports for immobilizing the motor radially can be installed on the inner walls of the motor housing. For example, an elastic ring or a plurality of sprayed-on ridges composed of an elastomer can cover the inner circumference of the receptacle housing in the manner of a circle and support the electric motor against the housing wall.

A good radial immobilization of the motor in the motor housing results when a plurality of—typically three or four—elastic decoupling elements attached axially to the inner wall of the receptacle housing are provided that minimize a transfer of noise and vibration from the motor to the housing. In advantageous fashion, these radial decoupling elements can also be sprayed directly onto the rigid wall of the motor housing.

A particularly advantageous exemplary embodiment of the device according to the invention results when the radial decoupling elements extending axially in the receptacle housing are formed directly on the resilient-elastic holding elements. This functional combination of axial and radial decoupling is very practical in terms of production engineering, and it makes it possible to reliably decouple the motor housing from the motor with relatively simple means when the motor is mounted in the receptacle housing, and production expense is reduced. To realize these decoupling elements—which act axially as well as radially—the resilient-elastic holding elements and the regions of the inner wall of the receptacle housing that are axially aligned with them are coated with an elastic material that decouples the motor and the motor housing from each other, but which reliably secures the motor in the housing.

If the center of gravity of the motor is located outside of the base of the resilient-elastic holding element, however, then it is preferable to install the radial decoupling elements separately in the rigid region of the receptacle housing, so that the detent noses are not placed under bending load and become misshapen by the weight of the motor or rotating forces, by way of which a fixed position of the motor in the housing and, therefore, in the body of the vehicle would no longer be ensured.

A further advantageous exemplary embodiment of the device according to the invention is attained when a counter-bearing is provided in the motor housing, which said counter-bearing results in an additional axial and radial immobilization of the motor in the receptacle housing. This is attained, in particular, by the fact that the counter-bearing also comprises an elastic damping element or is designed directly as such.

A particularly advantageous exemplary embodiment that is easy to realize results when the counter-bearing is sprayed directly into the receptacle housing. To this end, the counter-bearing can also be produced out of a thermoplastic elastomer that is sprayed into the housing in a two-component spray process. A counter-bearing is particularly advantageous that comprises a plurality of pegs extending in the shape of a star, which said pegs comprise a roller-shaped surface on their side facing the motor and can therefore capture any oscillating motions of the motor in the motor housing.

As an alternative, the counter-bearing can also be pre-mounted on the motor itself, also with corresponding elastic elements.

BRIEF DESCRIPTION OF THE DRAWINGS

Further advantages of the device according to the invention are indicated in the description and the drawings.

Exemplary embodiments of the device according to the invention are shown in the drawings in simplified, schematic fashion. The drawings, the description, and the claims contain numerous features in combination. One skilled in the art will advantageously consider them individually as well and combine them into reasonable further combinations.

DETAILED DESCRIPTION OF THE PREFERRED EMBODIMENTS

Figure 1:
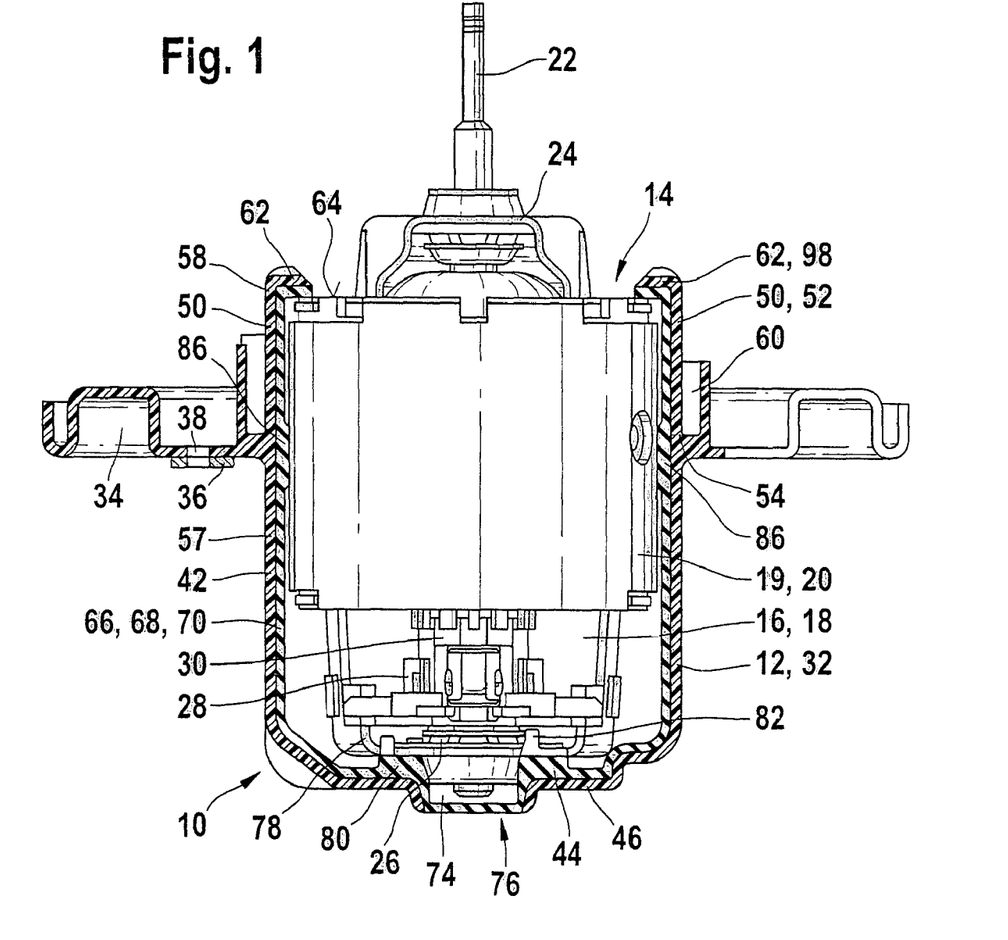
FIG. 1 is a sectional drawing through a first exemplary embodiment of a device according to the invention with electric motor inserted.

A first exemplary embodiment of the device 10 according to the invention is shown in FIG. 1. In this exemplary embodiment, the device 10 comprises a receptacle housing 12 with a receiving opening 14, through which a motor 16, in particular an electric motor 18, can be inserted in the housing 12. In the representation shown in FIG. 1, the electric motor 18 has already been completely inserted into the receptacle housing. In schematic fashion, shown in simplified form, the electric motor 18 [is equipped] with a pole ring 20—which simultaneously forms a pole housing 19—a motor shaft 22, a first bearing 24, and a second bearing 26 for holding the shaft 22, and a brush holder 28 with associated commutator 30.

A motor flange 34 is located on the outside of the receptacle housing 12 functioning as motor housing 32, which said motor flange is developed integral with the receptacle housing 12 in the exemplary embodiment in FIG. 1. Via this motor flange 34, the electric motor 18 can be mounted on an appropriate carrier element 36 of a ventilation system or air conditioner and/or directly to the body of a motor vehicle. The motor flange 34 comprises openings 38 for mounting the motor housing 32 on the carrier element 36. Furthermore, devices for electrically connecting the motor 18 with a current and voltage source (not shown in FIG. 1) to operate the electric motor 18 can be located on the motor flange 34 and/or on the outside of the receptacle housing 12. As an option, holding devices can be formed on the motor housing 32 and/or on the motor flange 34 for mounting further components of the electric motor 18 as well as the fan.

In the exemplary embodiment in FIG. 1, the receptacle housing 12 is composed of plastic and is developed in the shape of a pot comprising a cylindrical housing part 42 that substantially encloses the inserted electric motor 18, and comprising a bottom part 46 that is opposite the receiving opening 14 and, in the exemplary embodiment, is closed except for a region for accommodating a counter-bearing 44.

A plurality of resilient-elastic holding elements 50 extending axially relative to the motor shaft 22 for immobilizing the electric motor 18 in the receptacle device 12 is installed in the region of the receiving opening 14 of the motor housing 32. In the exemplary embodiment shown, the holding elements 50 are designed as resilient, radially displaceable tongues 52 of the cylindrical part 43 of the receptacle housing 12, as shown in the detained views of this exemplary embodiment in FIGS. 2 and 3. To accomplish this, a first end 54 of these spring elements 50 is permanently interconnected with the motor housing 12 by developing it as an integral part of the circumference of the receptacle housing 12. On its axial longitudinal sides 55, the flat spring 55 is separated from the wall 57 of the receptacle housing 12 by means of slits 56. With their second, exposed ends 58, the flat springs 52 can be pressed in the radial direction into associated, pocket-like recesses 60 in the wall 57 of the motor housing 32 in order to expose the receiving opening 14 of the receptacle housing 12 so that the electric motor 18 can be guided into the receptacle housing 12.

Figure 2:
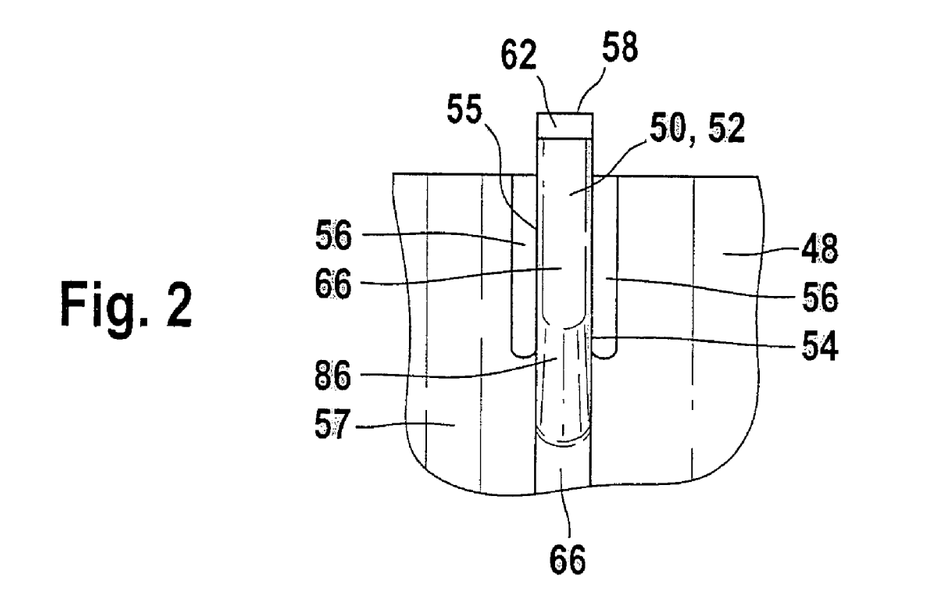
FIG. 2 is a detained view of the first exemplary embodiment of the device according to the invention.

FIG. 2 shows a section of the wall 57 of the receptacle housing 12 of the device 10 according to the invention. Two lateral indentations and/or slits 56 separate the holding element 50 from the wall 57 of the housing 12, thereby forming the tongues 52, which said tongues allow the holding element 50 to move in resilient fashion.

Figure 3:
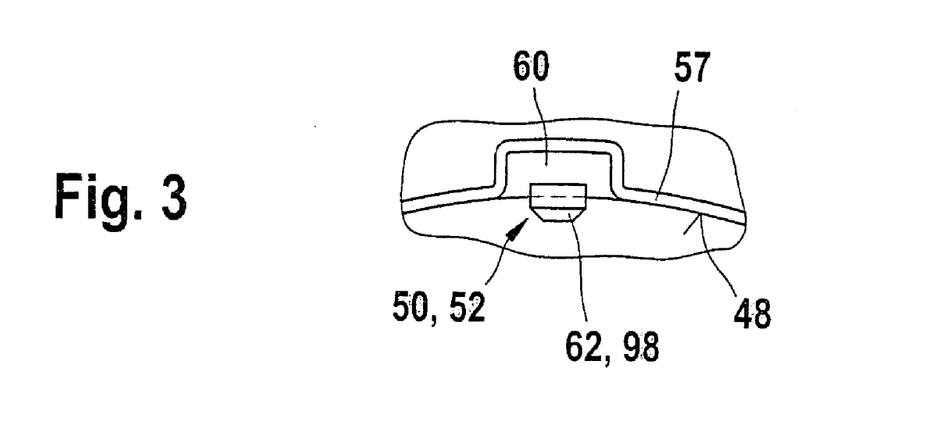
FIG. 3 is the detained view of the device according to the invention in FIG. 2 in a different representation.

FIG. 3 shows, in a top view, the position of the flat springs 52 relative to the recesses 60 in the wall 57 of the receptacle housing 12 of the device 10 according to the invention before the electric motor 18 has been inserted.

If the electric motor 18 is inserted in the receptacle housing 12, the resilient tongues 52 are pressed radially outwardly into the pocket-like recesses 60, so that the electric motor 18 can be inserted past the holding elements 50 and in the housing 32. The resilient-elastic holding elements 50 then act with a corresponding counter-force on the electric motor 18, thereby immobilizing it in the motor housing 32.

On its second end 58 opposite the bottom part 46 of the receptacle housing 12, the resilient-elastic holding elements 50 comprise additional, radially projecting, hook-shaped fastening elements 62, as shown in the representation in FIG. 1 in particular. In the exemplary embodiment presented in FIG. 1, these fastening hooks 62 in the form of detent noses 98 grip around an end face 64 of the inserted electric motor 18 and thereby immobilize it in the axial direction in the receptacle housing 12.

For the vibration decoupling and a corresponding silencing of the motor 18, the resilient-elastic holding elements 50 and the hook-shaped fastening elements 62 on the side facing the motor 18 are coated with an elastic material 66 in the form of an elastomer 68. The exemplary embodiment in FIG. 1 is a thermoplastic elastomer 70 that is applied into the plastic housing directly in a two-component spray process.

The elastomer coating of the flat springs 52 travels in the axial direction over the actual length of the spring and, therefore, beyond the first end 54 of the resilient tongues 52, on the inner housing wall 48, and down to the bottom region 46 of the receptacle housing 12.

Located in the bottom part 46 of the pot-shaped receptacle device 12 is a recess 74 in the form of a central opening 76 for a second bearing 26 of the shaft 22 of the electric motor 18. In the exemplary embodiment of FIG. 1, this bearing 26 of the motor shaft 22 is secured via a bracket 78 against the pole housing 19 and, therefore, the electric motor 18 itself. An elastic damping element 80 for the shaft bearing 26 is formed in the central base opening 76 of the device 10 according to the invention that functions as counter-bearing 44 for securing the electric motor 18 axially by means of the snap-in hooks 62. This damping counter-bearing 44, which is composed of an elastomer 68, is also sprayed directly into the housing 12, and also provides radial damping and immobilization of the electric motor 18 in the motor housing 32.

A plurality of stop pegs 82 pointing in the direction toward the receiving opening 14 are also formed in the bottom region of the receptacle housing 12 according to the invention. These stop pegs 82—which can also be coated with an elastic damping material 66—grip into openings of the electric motor 18, or they each clamp the sides of a bearing bracket 78. In this fashion, the motor 18 can be secured against turning in the motor housing 32.

To provide additional radial decoupling and immobilization of the electric motor 18 in the motor housing 32, elastic decoupling elements 86 extending in the axial direction and formed radially inwardly are located in the region of the first end 54 of the resilient-elastic holding elements 50, which said elastic decoupling elements exert a corresponding pressure on the pole ring 20 of the electric motor 18 and therefore hold it in the motor housing securely but in vibration-damped fashion. By way of this measure, the dynamic stability of the motor 18 in the motor housing 32 is markedly improved.

Figure 4:
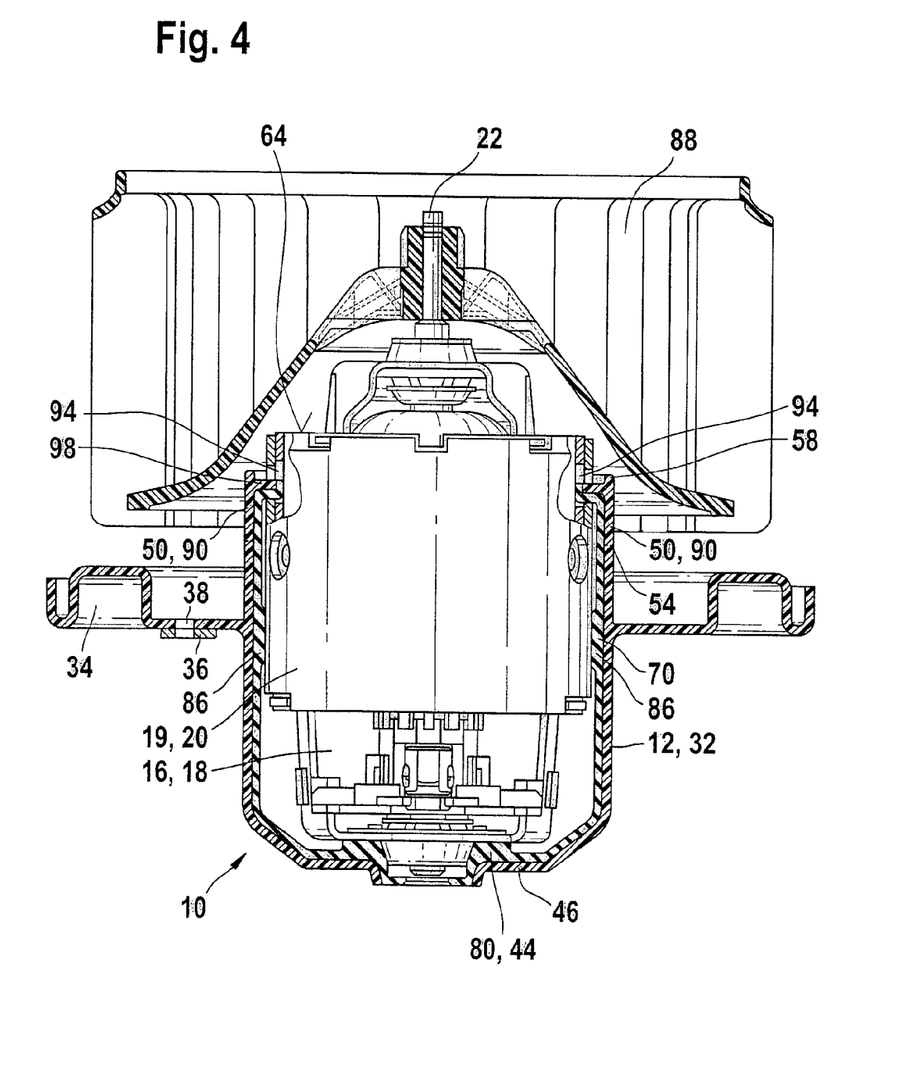
FIG. 4 is a sectional drawing of a second exemplary embodiment of the device according to the invention.

FIG. 4 shows a partial view of a second exemplary embodiment of the device according to the invention. Identical components of this exemplary embodiment are labelled with the same reference numerals as the first exemplary embodiment in FIG. 1.

Again, the device 10 according to the invention is composed of a pot-shaped receptacle housing 12, on which a motor flange 34 is formed as an integral component to mount a motor 16 on a carrier element 36 of a heater system and/or air conditioner of a vehicle. In the representation in FIG. 4, an electric motor 18 is inserted in the motor housing 32. The individual, schematically shown components of the electric motor 18 correspond to those in the exemplary embodiment in FIG. 1. Additionally, a fan and/or blower bladed wheel 88 is mounted on a shaft 22 of the electric motor 18.

The exemplary embodiment of the device 10 according to the invention shown in FIG. 4 also comprises a plurality of resilient-elastic holding elements 50 distributed around the circumference of the receptacle housing, although only two of them are shown in FIG. 4. The resilient-elastic holding elements 50 are developed in this exemplary embodiment in the form of flexible springs with its first end 54 formed as a single component on the motor housing 32—produced preferably out of plastic—and it is elastically flexible on its second, exposed end 58, particularly in the radial direction, when a certain force is applied. Axial slits 56 in the direction of the wall 57 of the receptacle housing 12—which separate the resilient-elastic holding elements 50 laterally from the receptacle housing—make the radial flexibility possible. The manner in which the spring elements 90 are formed out of the receptacle housing 12 is illustrated clearly in the detained representations in FIGS. 5 and 6.

Figure 5:
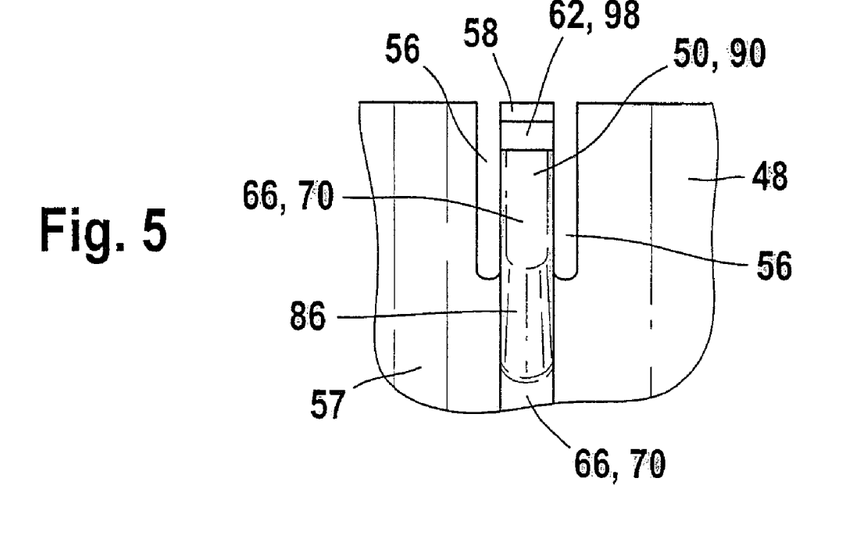
FIG. 5 is a detained view of the second exemplary embodiment of the device according to the invention.
Figure 6:
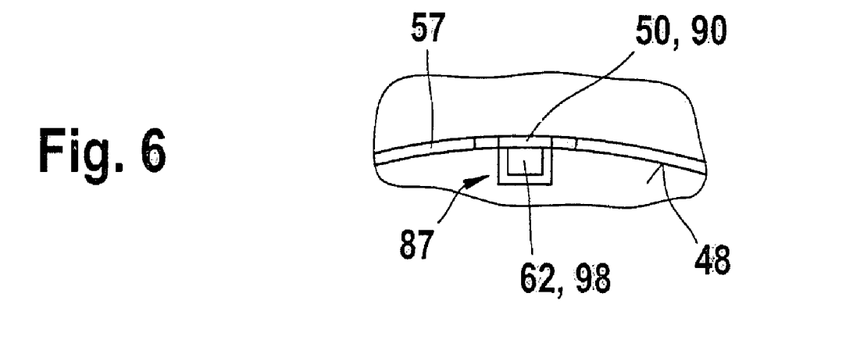
FIG. 6 is the detained view of the device according to the invention in FIG. 5 in another representation.

FIG. 5 shows a section of the wall 57 of the receptacle housing 12 with a flexible spring 90 formed out of it accordingly. FIG. 6 shows the same section in a top view, for clarification.

The side of the resilient-elastic holding elements 50 facing the motor 18 is coated with an elastic damping means 66 which, in the special exemplary embodiment of FIG. 4, is a thermoplastic elastomer 70 that is sprayed on directly.

On its exposed top end 68, the elastic flexible spring 90 comprises fastening elements 62 pointing radially into the receptacle housing 12 in the form of detent noses 98 that are also coated with an elastic damping material 56 on its side facing the motor. These fastening elements 62 grip into the electric motor, thereby immobilizing it.

In the exemplary embodiment shown in FIG. 4, the resilient-elastic holding elements 50 grip with their radial fastening elements 62 installed on their exposed end 58 directly into correspondingly-aligned openings 94 of the pole housing 19 and/or the pole ring 20 of the electric motor 18.

The fact that the fastening hooks 62 grip inwardly in a position that is not near an end face 64 of the motor 18 makes it possible to attain an arrangement of the bladed fan wheel 88 that is advantageous and close to the motor. Due to this measure, the depth of the entire fan arrangement is reduced in advantageous fashion, e.g., as compared with the exemplary embodiment shown in FIG. 1, since the hook geometry of the detent noses 98 does not collide with the geometry of the bladed fan wheel 88.

By means of a tangential—and possibly elastic as well—coating 87 of the fastening hooks 62 and/or 98 in the region where they grip into the motor 18, any noise and vibration coupling into the hooks 62, 98 and/or the resilient-elastic holding elements 50 and, therefore, into the motor housing 32 are prevented, and the motor 18 is also secured against rotation.

For the radial immobilization and vibration damping of the electric motor 18 in the device 10 according to the invention according to FIG. 4, a plurality of elastic decoupling elements 86 extending in the axial direction and formed on the inner wall 48 of the receptacle housing 12 is installed in the region of the first end 54 of the resilient-elastic holding elements 50. In the exemplary embodiment, they are sprayed directly onto the holding elements 50 and the housing inner surface 48 aligned therewith. In principle, they can be interconnected with the housing 12 in another fashion as well, however.

Located in the bottom region 46 of the device 10 according to the invention as shown in the exemplary embodiment in FIG. 4 is a further, elastic damping element 80 that is also sprayed onto the bottom 46 of the receptacle housing 12 as a thermoplastic elastomer 70 in a two-component spray process. This further damping element 80 functions as a counter-bearing 44 for the axial as well as radial immobilization of the electric motor 18 in the receptacle device 12.

Figure 7:
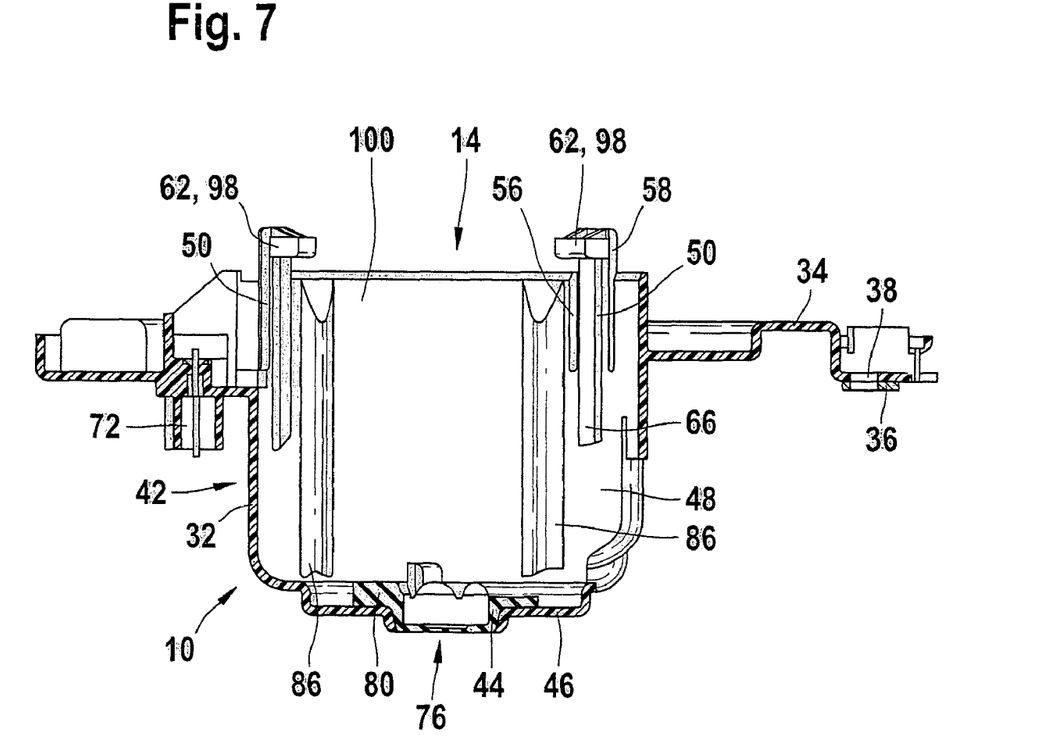
FIG. 7 is a sectional drawing of a further exemplary embodiment of the device according to the invention.

FIG. 7 shows a further exemplary embodiment of the device 10 according to the invention having a pot-shaped motor housing 32 accommodating an electric motor 18, on which said motor housing a motor flange 34 is installed for mounting the device 10 on a body of a motor vehicle. The motor housing 32 comprises a receiving opening 14, a cylindrical housing part 42 accommodating the motor 18 in the installed state, and a housing base 46 in which a central opening 76 is provided for the shaft 22 of an electric motor 18 or for a damping element 80 supporting a bearing of the shaft 22.

Appropriate openings 38 are provided on the motor flange 34 for screwing the device 10 according to the invention to a carrier part 36 of the body or to the air conditioner of a motor vehicle. Also formed on the motor flange is a connection opening 72 for an electrical plug contact for operating the electric motor 18.

The essentially pot-shaped receptacle housing 12 comprises a plurality of resilient-elastic holding elements 50 distributed around its circumference, which said holding elements are designed in the shape of a tongue 52 and as a single component out of the receptacle housing 12. To this end, there are axial indentations 56 on the sides of the resilient tongues 50, 52 in the receptacle housing 12 that make a radial displacement and/or bending of the resilient tongues 50, 52 possible.

The exposed end 58 of the resilient tongues 50, 52 is equipped with fastening elements 62, 98 pointing radially inwardly toward the motor shaft 22 and extending off of the resilient tongues 50, 52 at a right angle that secure an electric motor 18 inserted in the receptacle housing 12 against displacement in the axial direction. The resilient tongues 50, 52 and the fastening elements 62, 98 can be coated on the inside with an elastic damping material 66.

A plurality of decoupling elements 86 that project radially into the receptacle housing 12 to a certain extent and that extend axially in this exemplary embodiment are located on the inner wall 48 of the receptacle housing 12 for the radial decoupling and immobilization of an electric motor 18 placed in the receptacle housing 12. These elastic decoupling elements 86 for the radial movement of the motor 18 can have the shape of a roller or a ball, or they can be pointed.

In the exemplary embodiment according to FIG. 7, the radial decoupling elements 86 are located at a distance from the resilient-elastic holding elements 50—which ensure the axial immobilization and decoupling of the electric motor 18—in the rigid region 100 of the receptacle housing 12, so that the axial and the radial damping components are arranged separated from each other around the circumference of the motor housing 12 according to the invention. A separated installation of the radial decoupling elements 86 is preferred, in particular, when the center of gravity of the electric motor is located outside of the base of the resilient-elastic holding element. Otherwise, the holding elements 50 could be placed under excessive bending load and become misshapen by the weight of the motor or rotating forces, by way of which a fixed position of the motor would no longer be ensured.

An elastic damping element 80, as the counter-bearing 44, is located in the bottom region 46 of the pot-shaped receptacle device 12, which said damping element can be sprayed into the receptacle housing 12, or it can be installed in the housing in other methods known to one skilled in the art. This counter-bearing 44 counteracts the radial and/or axial decoupling elements of the device 10 according to the invention and therefore immobilizes the electric motor 18 in the axial as well as radial direction.

Figure 8:
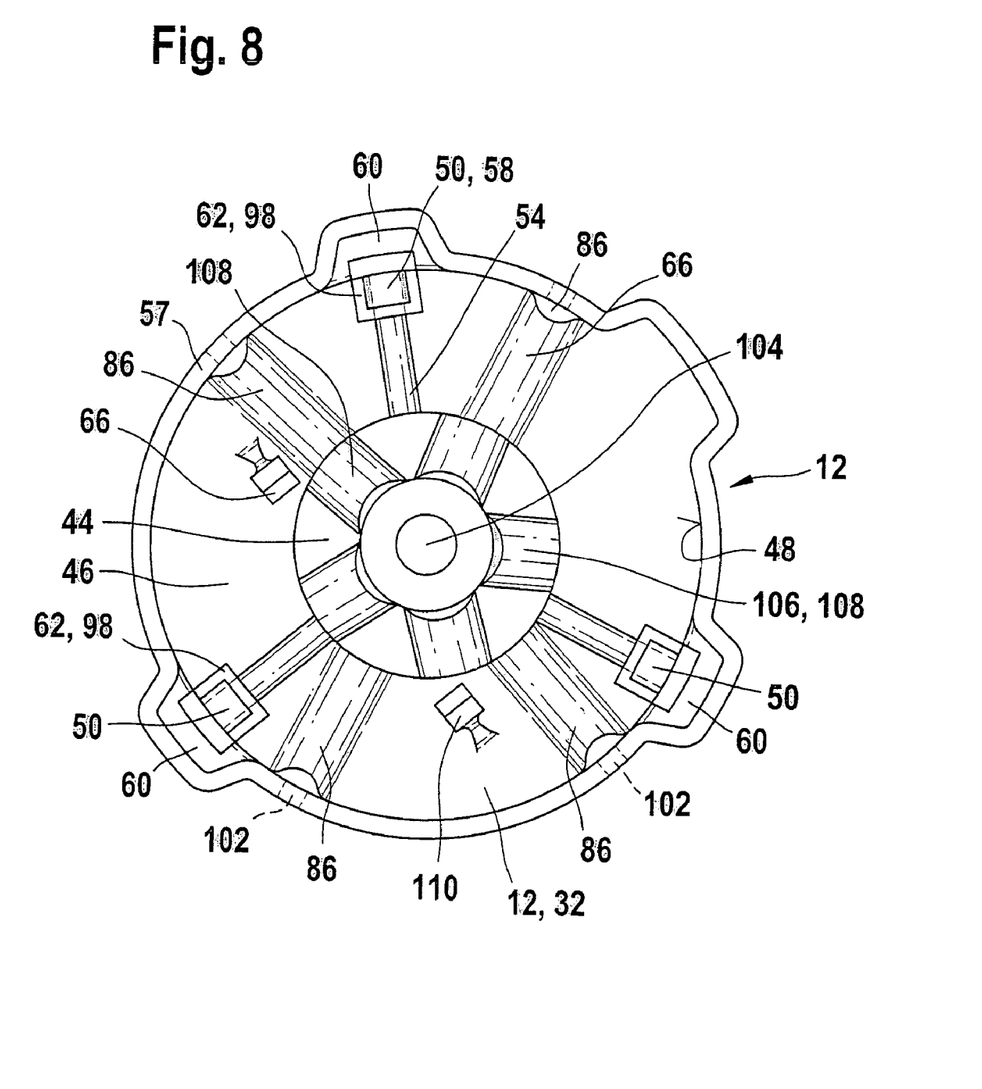
FIG. 8 is a top view of the exemplary embodiment of the device according to the invention according to FIG. 7, shown in detail.

FIG. 8 shows the pot-shaped receptacle housing 12 of the device 10 according to the invention in a view looking into the housing 12. In this exemplary embodiment, three resilient-elastic holding elements 50 are distributed around the circumference, which said holding elements can be pressed radially outwardly into pocket-like recesses 60 provided on the circumference of the housing by applying appropriate force. To this end, the holding elements 50 are interconnected on their first end 54 with the receptacle housing 12, but they are separated from said receptacle housing on their sides by slits 56. The holding elements 50 comprise radially inwardly projecting snap-in hooks 98 on their second axial end 58, which corresponds to the visible top end in FIG. 8.

Radial decoupling elements 86 composed of an elastic material 66 are also distributed around the circumference of the housing 12 at a distance from the resilient-elastic holding elements 50. The radial decoupling elements 86 extend in the axial direction on the inner wall 48 of the receptacle housing 12 and have a convex surface directed toward the inner space of the receptacle housing 12 that can also be designed spherical or pointed in shape and which, when the motor is installed, can come to rest, e.g., against the pole housing 19 and/or the pole ring 20 of the electric motor 18 and, as a result, immobilize them radially in the motor housing 32. To increase the elasticity of the radial decoupling components 86, axial indentations 102 in the receptacle housing 12 can be formed in the wall 57 of the pot-shaped receptacle housing 12, on the back side of the radial decoupling elements 86, into which said indentations the elastic material 66 of the radial decoupling elements 86 can be pressed by the inserted motor, so that the elastic behavior of these damping components also increases.

A counter-bearing 44 composed of an elastic material 66, preferably a sprayed-on thermoplastic elastomer 70, is formed in the bottom element 46 of the pot-shaped receptacle housing 12 of the device 10 according to the invention. In the exemplary embodiment shown, the elastic counter-bearing 44 comprises a central opening 104 for the shaft 22 of the electric motor 18. Additionally, the counter-bearing 44 comprises—on its side facing the receiving opening 14 of the motor housing 12—a plurality of radially outwardly extending pegs 106, arranged in the shape of a star, in the form of roller bodies 108, on which the electric motor 18 and/or the bearing bracket 78—on which the associated bearing of the motor shaft 22 is mounted—can roll off in a fashion that is damping to a certain extent when tumbling motions take place.

The counter-bearing 44 designed in this fashion makes it possible for motor vibrations that occur to be decoupled radially as well as axially.

In this exemplary embodiment of the device according to the invention, two stop pegs 110 pointing in the direction of the receiving opening 14 are also located in the bottom region of the pot-shaped receptacle housing 12, between which a bearing bracket 78 of the electric motor 18 can be clamped. In the exemplary embodiment shown, these stops 110 are also equipped with an elastic damping material 66 on their contact points toward the motor. Using these stops 110, the motor 18 can be secured against rotation inside the motor housing 32. The stop pegs 110 are easy to form as an integral component on the motor housing 32 or directly on the counter-bearing 44.

The device according to the invention is not limited to the exemplary embodiments presented in the description.

For instance, the device according to the invention is not limited to a use with fan motors. Any other type of motor that must be installed in vibration-decoupled and, therefore, silenced fashion can be mounted in advantageous fashion using the mounting device according to the invention.

In particular, the radial decoupling elements need not extend axially on the housing wall of the motor receptacle. Rather, two or more circular decoupling elements in the form of appropriate elastic ridges extending on the inside around the circumference of the housing wall are feasible as well.

The elastic decoupling materials do not necessarily have to be sprayed on. Instead, they can also be applied using other processes known to one skilled in the art, such as bonding directly to the appropriate components of the motor housing.

What is claimed is:

1. A device (10) for mounting an electric motor (18), in particular a fan motor, comprising an essentially pot-shaped receptacle housing (12)—functioning as motor housing (32)—with a receiving opening (14) into which at least part of the electric motor (18) extends, comprising a holding flange (34) attached to the receptacle housing (12) for mounting the motor housing (32) to a carrier element (36), e.g., a motor vehicle heater system and/or air conditioner, and comprising means for immobilizing the electric motor (18) radially and axially in the motor housing (32), wherein the receptacle housing (12) comprises at least one resilient-elastic holding element (50, 52, 90) for axial immobilization, at least part of which said holding element comprises a coating of elastic material (66) on its side facing the motor (18), and is interconnected via its first axial end (54) with the receptacle housing (12)

and bears directly against the motor (18) in the region of its second axial end (58).

2. The device according to claim 1, wherein the elastic material (66) that coats the resilient-elastic holding element (50, 52, 90) is an elastomer (68), in particular a thermoplastic elastomer (70).

3. The device according to claim 1, wherein the elastic material (66, 68, 70) is sprayed onto the at least one resilient-elastic holding element (50, 52, 90).

4. The device according to claim 1, wherein the at least one resilient-elastic holding element (50, 52, 90) is developed on the pot-shaped receptacle housing (12) with spring action and preferably as a single component.

5. The device according to claim 1, wherein the at least one resilient-elastic holding element (50, 52, 90) comprises a hook-shaped fastening element (62, 98) extending in the radial direction on its end (58) facing the receiving opening (14) of the motor housing (32).

6. The device according to claim 5, wherein a plurality, preferably three, of the resilient-elastic holding elements (50, 52, 90) grip—with their hook-shaped ends (62, 98)—an end face (64) of the motor (18) penetrated by the motor shaft (22) of the electric motor (18).

7. The device according to claim 1, wherein a plurality, preferably three, of the resilient-elastic holding elements (50, 52, 90) grip into—with their hook-shaped ends (62, 98)—the motor, in particular in the pole ring (20) of the motor (18) at a point not near the end face (64) of the electric motor.

8. The device according to claim 7, wherein an electric motor (18) placed in the receptacle housing (12) is secured against radial rotation by means of a tangential, in particular, elastic coating (89) on the hook-shaped ends (62, 98) at the resilient-elastic holding elements (50, 52, 90) in the region where they grip into the motor (18).

9. The device according to claim 1, wherein an electric motor (18) placed in the receptacle housing (12) is secured against rotation by a plurality of stops (82) extending in the direction toward the receiving opening (14) and installed on the inside of the end of the receptacle housing (12) opposite the receiving opening (14).

10. The device according to claim 1, wherein the motor housing (32) and the resilient-elastic holding elements (50, 52, 90) are composed of plastic, in particular a polypropylene plastic.

11. The device according to claim 1, wherein an electric motor (18) placed in the receptacle housing (12) is secured in the radial direction by at least one elastic decoupling element (86) extending along the inner wall (48) of the receptacle housing (12).

12. The device according to claim 11, wherein an electric motor (18) placed in the receptacle housing (12) is secured in the radial direction by a plurality of elastic decoupling elements (86) extending axially along the inner wall (48) of the receptacle housing (12).

13. The device according to claim 12, wherein the at least one radial decoupling element (86) is composed of an elastomer (68), in particular a thermoplastic elastomer (70), and is integrally extruded on the inner wall (48) of the receptacle housing (12).

14. The device according to claim 12, wherein the axially extending, radial decoupling elements (86) are formed on the side of the resilient-elastic holding elements (50, 52, 90) facing the electric motor (18).

15. The device according to claim 1, wherein a counter-bearing (44) is provided to immobilize an electric motor (18) axially and/or radially in the motor housing (32).

16. The device according to claim 15, wherein the counter-bearing (44) comprises an elastically shaped-out damping element (80).

17. The device according to claim 16, wherein the counter-bearing (44) is composed of an elastomer (68), in particular a thermoplastic elastomer (70), that is sprayed directly on the receptacle device (12).

18. The device according to claim 1, wherein an elastic counter-bearing (44) is pre-mounted on an electric motor (18) placed in the receptacle housing (12).

19. The device according to claim 17, wherein the counter-bearing (44) comprises a plurality of radially extending pegs (106) that point a convex, in particular roller-shaped surface contour (108) in the direction toward the receiving opening (14).

20. A device (10) for mounting an electric motor (18), in particular a fan motor, comprising an essentially pot-shaped receptacle housing (12)—functioning as motor housing (32)—with a receiving opening (14) into which at least part of the electric motor (18) extends, comprising a holding flange (34) attached to the receptacle housing (12) for mounting the motor housing (32) to a carrier element (36), e.g., a motor vehicle heater system and/or air conditioner, and comprising means for immobilizing the electric motor (18) radially and axially in the motor housing (32), wherein the receptacle housing (12) comprises at least one resilient-elastic holding element (50, 52, 90) for axial immobilization, at least part of which said holding element comprises a coating of elastic material (66) on its side facing the motor (18), and is interconnected via its first axial end (54) with the receptacle housing (12) and bears directly against the motor (18) in the region of its second axial end (58), and wherein the at least one resilient-elastic holding element (50, 52, 90) comprises a hook-shaped fastening element (62, 98) extending in the radial direction on its end (58) facing the receiving opening (14) of the motor housing (32).

21. A device (10) for mounting an electric motor (18), in particular a fan motor, comprising an essentially pot-shaped receptacle housing (12)—functioning as motor housing (32)—with a receiving opening (14) into which at least part of the electric motor (18) extends, comprising a holding flange (34) attached to the receptacle housing (12) for mounting the motor housing (32) to a carrier element (36), e.g., a motor vehicle heater system and/or air conditioner, and comprising means for immobilizing the electric motor (18) radially and axially in the motor housing (32), wherein the receptacle housing (12) comprises at least one resilient-elastic holding element (50, 52, 90) for axial immobilization, at least part of which said holding element comprises a coating of elastic material (66) on its side facing the motor (18), and is interconnected via its first axial end (54) with the receptacle housing (12) and bears directly against the motor (18) in the region of its second axial end (58), and wherein an electric motor (18) placed in the receptacle housing (12) is secured in the radial direction by at least one elastic decoupling element (86) extending along the inner wall (48) of the receptacle housing (12).

* * * * *